US008259440B2

(12) United States Patent  
Lin (10) Patent No.: US 8,259,440 B2
(45) Date of Patent: Sep. 4, 2012

(54) DISPLAY MODULE HAVING A MOUNTABLE AND REMOVABLE DISPLAY PANEL, ELECTRONIC DEVICE HAVING THE DISPLAY MODULE, AND ASSEMBLY OF A COMPUTING DEVICE AND A DISPLAY CASING

(75) Inventor: Li-Sheng Lin, Taipei Hsien (TW)

(73) Assignee: Wistron Corporation (TW)

( * ) Notice: Subject to any disclaimer, the term of this patent is extended or adjusted under 35 U.S.C. 154(b) by 353 days.

(21) Appl. No.: 12/623,384

(22) Filed: Nov. 21, 2009

(65) Prior Publication Data
US 2010/0284138 A1 Nov. 11, 2010

(30) Foreign Application Priority Data

May 6, 2009 (TW) ................................ 98207745 U (51) Int. Cl.
H05K 7/14 (2006.01)
(52) U.S. Cl. ............... 361/679.29; 361/679.26; 248/917
(58) Field of Classification Search ............. 361/679.01, 361/679, 27, 29, 679.21, 679.26; 248/917–924
See application file for complete search history.

(56) References Cited

U.S. PATENT DOCUMENTS

| 6,310,768 | B1 * | 10/2001 | Kung et al. | 361/679.29 |
| 7,379,292 | B2 | 5/2008 | Tsai et al. | |
| 7,447,005 | B2 * | 11/2008 | Han | 361/679.27 |
| 7,656,652 | B2 * | 2/2010 | Moser | 361/679.27 |
| 7,965,366 | B2 * | 6/2011 | Shie | 349/150 |

* cited by examiner

Primary Examiner — Jinhee Lee
Assistant Examiner — Ingrid Wright
(74) Attorney, Agent, or Firm — The Mueller Law Office, P.C.

(57) ABSTRACT

An electronic device includes a display module and a computing device. The display module includes a display casing, a connecting unit disposed on the display casing, and a display panel. The connecting unit includes a first electrical connecting member. The display panel includes a panel unit and a second electrical connecting member disposed on the panel unit. The first and second electrical connecting members are configured such that one is a slot with terminals and the other is a circuit board provided with copper foil circuits. The panel unit is connectible electrically to the computing device by coupling insertably the second electrical connecting member to the first electrical connecting member, thereby permitting the display panel to be easily assembled to or disassembled from the display casing.

24 Claims, 10 Drawing Sheets

FIG. 10

DISPLAY MODULE HAVING A MOUNTABLE AND REMOVABLE DISPLAY PANEL, ELECTRONIC DEVICE HAVING THE DISPLAY MODULE, AND ASSEMBLY OF A COMPUTING DEVICE AND A DISPLAY CASING

CROSS-REFERENCE TO RELATED APPLICATION

This application claims priority of Taiwanese Application No. 098207745, filed on May 6, 2009.

BACKGROUND OF THE INVENTION

1. Field of the Invention

The invention relates to a display module and an electronic device having the display module, more particularly to a display module having a display panel that can be mounted insertably in a display casing, and an electronic device having the display module.

2. Description of the Related Art

In a conventional electronic device having a display (such as the notebook computer disclosed in U.S. Pat. No. 7,379,292), a display panel is mounted in a casing and is connected to a computing device of the electronic device through wires.

However, the fact that the display panel is connected to the computing device by wires necessitates wiring and wire organization tasks, which are time-consuming and laborious. Moreover, if the display panel needs to be removed from the casing for maintenance or replacement, the removal operation and the subsequent re-mounting operation are relatively inconvenient.

SUMMARY OF THE INVENTION

Therefore, one object of the present invention is to provide a display module having a display casing and a display panel that can be easily assembled to or disassembled from the display casing.

Another object of the present invention is to provide a display module having a display casing and a display panel which can be coupled in a manner similar to card insertion so that problems associated with wiring between the display panel and a computing device and wire organization can be alleviated.

Still another object of the present invention is to provide an electronic device including the aforementioned display module.

Yet another object of the present invention is to provide an assembly of a computing device, and a display casing that permits easy assembly of a display panel to the display casing so as to be connected electrically to the computing device, and easy disassembly of the display panel from the display casing.

Accordingly, the electronic device of the present invention comprises a computing device and a display module. The computing device includes a housing, an electronic component module disposed within the housing, and an operating interface disposed in the housing and exposed from a top face of the housing. The display module includes a display casing and a connecting unit. The display casing is connected to the housing of the computing device and is formed with a recess. The connecting unit includes a flexible signal connecting member connected electrically to the electronic component module of the computing device, and a first electrical connecting member connected electrically to the flexible signal connecting member and exposed to the recess in the display casing. The first electrical connecting member is capable of movement relative to the display casing due to connection with the flexible signal connecting member. The display panel includes a panel unit for displaying images, and a second electrical connecting member disposed on the panel unit and connected electrically to the panel unit. The second electrical connecting member is coupled insertably to the first electrical connecting member so as to enable the display panel to be connected electrically to the electronic component module of the computing device and to be received in the recess in the display casing.

The present invention is characterized in that one of the first and second electrical connecting members is a circuit board provided with copper foil circuits, and the other of the first and second electrical connecting members is a slot connector for insertion of the circuit board thereinto.

The present invention is characterized in that the display casing includes a back plate and a frame connected to a front side of the back plate. An inner edge of the frame and the back plate cooperatively define the recess. The connecting unit further includes a case interposed between the back plate and the frame. The case includes a first portion and a second portion that are interconnected with one above the other. The first electrical connecting member is disposed in the first portion of the case, and the first portion is movable relative to the second portion.

The present invention is characterized in that the case is an integrally formed flexible member.

The present invention is characterized in that the first and second portions of the case are separate components that are connected pivotably with one above the other.

The assembly of the present invention is for insertable coupling of a display panel thereto.

The assembly comprises a computing device, a display casing, and a connecting unit. The computing device includes a housing, an electronic component module disposed within the housing, and an operating interface disposed in the housing and exposed from a top face of the housing. The display casing is connected to the housing of the computing device and is formed with a recess. The connecting unit includes a flexible signal connecting member connected electrically to the electronic component module of the computing device, and a first electrical connecting member connected electrically to the flexible signal connecting member and exposed to the recess in the display casing. The first electrical connecting member is capable of movement relative to the display casing due to connect ion with the flexible signal connecting member.

The first electrical connecting member is disposed for insertion of the display panel thereinto so as to enable the display panel to be connected electrically to the electronic component module of the computing device and to be received in the recess in the display casing.

The advantageous effect of the present invention resides in that, by providing the display casing and the panel unit with the first and second electrical connecting members, respectively, so that the panel unit can be assembled to the display casing and connected electrically to the computing device through the insertable coupling between the first and second electrical connecting members (e.g., a circuit board provided with copper foil circuits and a slot connector for receiving the circuit board), or can be disassembled from the display casing through separating the second electrical connecting member from the first electrical connecting member, the present invention provides relatively easy mounting and removal of the display panel.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
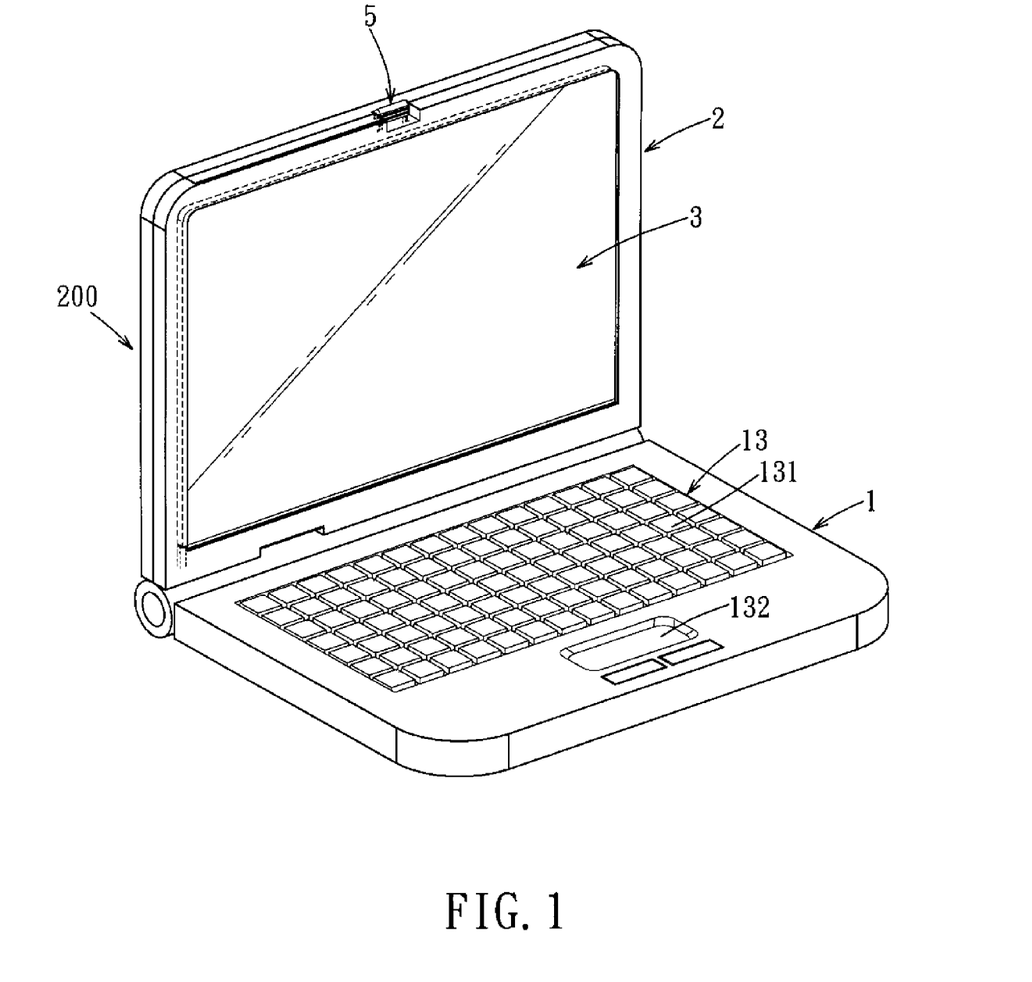
FIG. 1 is a perspective view of the first preferred embodiment of an electronic device having a display module that includes an easily mountable and removable display panel according to the present invention.
Figure 2:
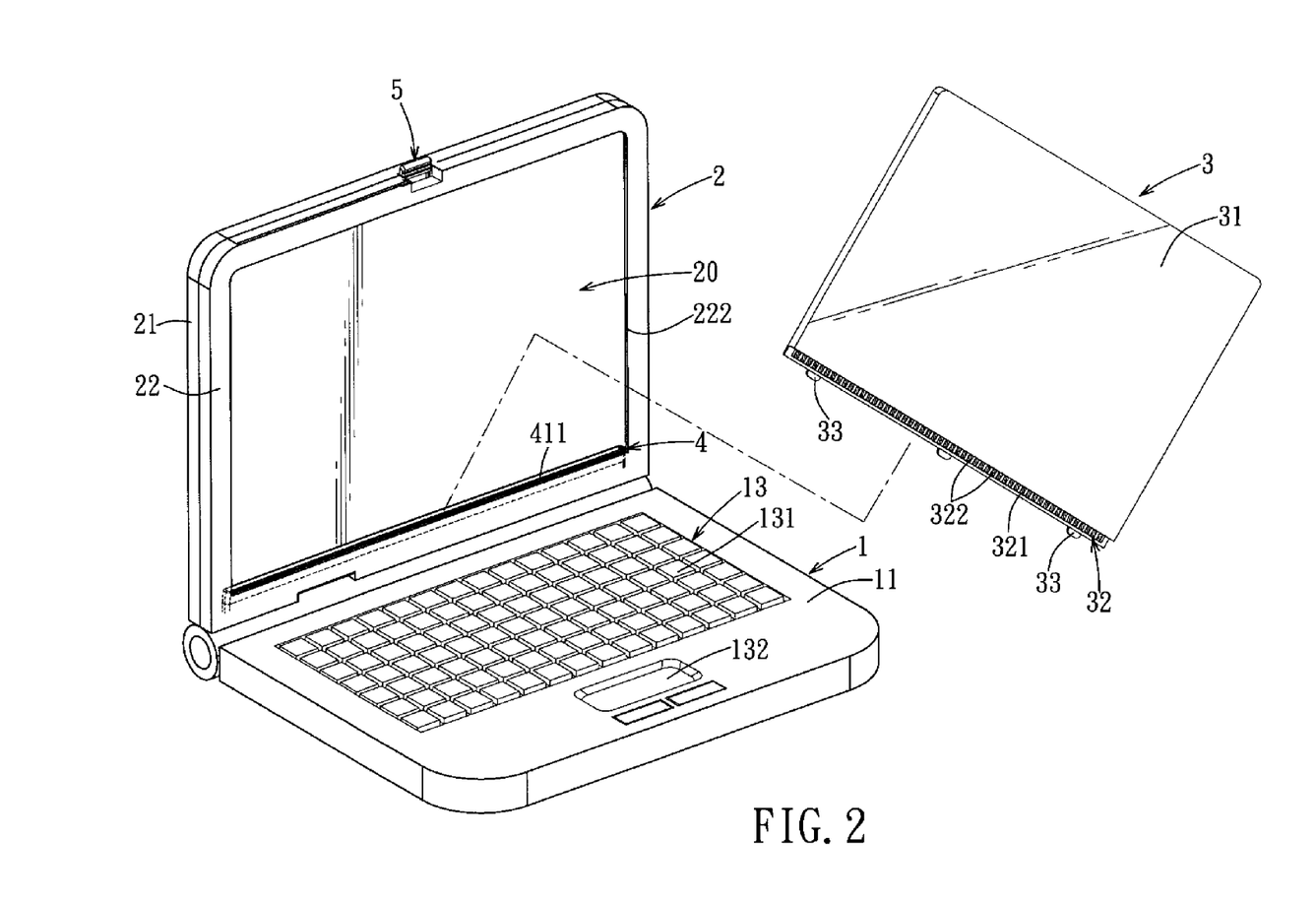
FIG. 2 is an exploded perspective view of the first preferred embodiment to illustrate a display casing and a display panel.

Referring to FIGS. 1 and 2, the first preferred embodiment of an electronic device according to the present invention is exemplified as a notebook computer, and comprises a computing device 1 and a display module 200. The display module 200 includes a display casing 2 connected to the computing device 1, a display panel 3, and a connecting unit 4. The display panel 3 can be connected electrically to the computing device 1 and mounted in the display casing 2 through the connecting unit 4, or can be disconnected electrically from the computing device 1 and removed from the display casing 2 by being separated from the connecting unit 4. In this way, the display panel 3 is easily mountable and removable.

Figure 4:
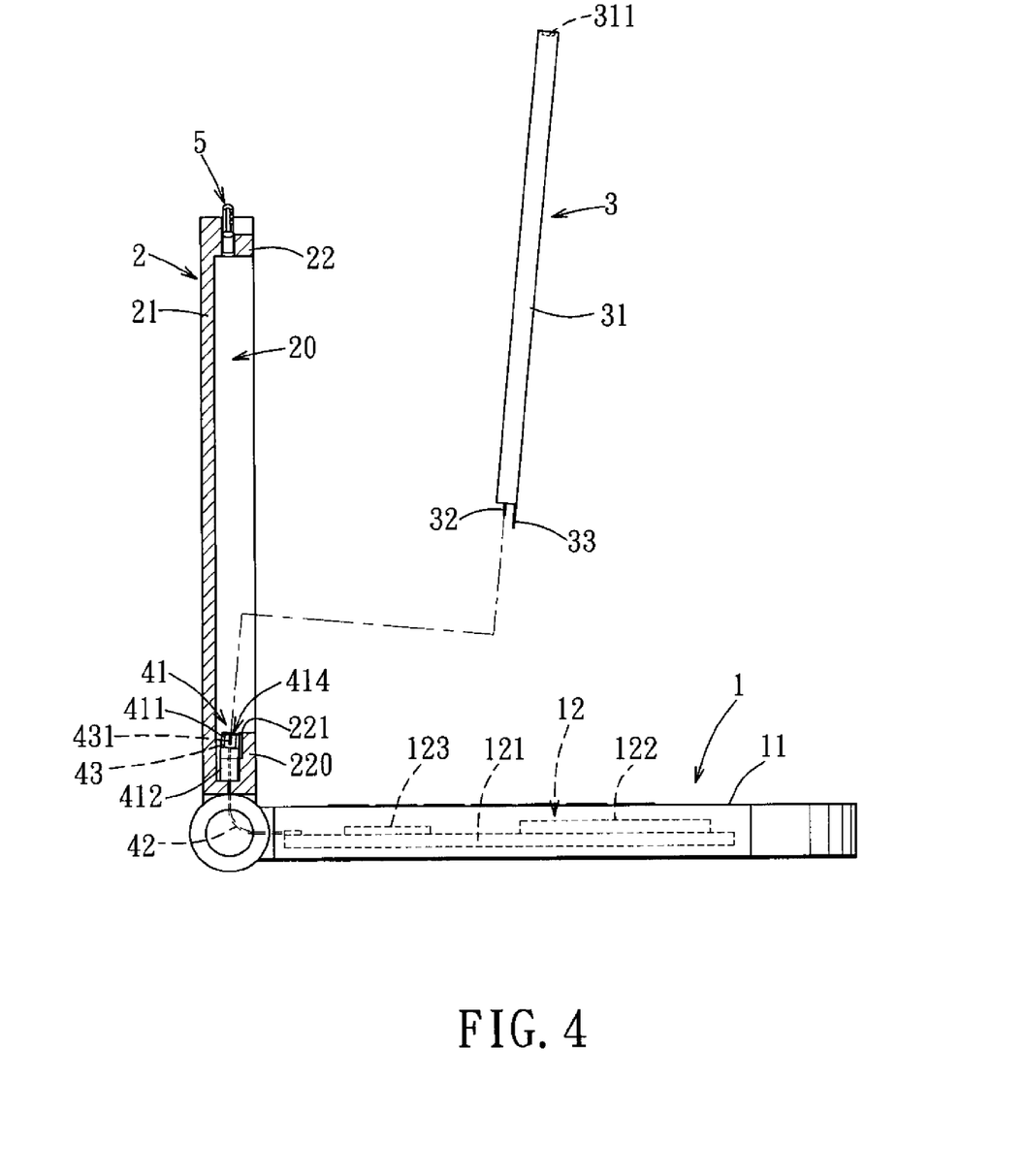
FIG. 4 is an exploded, partly sectional, schematic side view of the first preferred embodiment to illustrate the display casing and the display panel.

Referring to FIGS. 2 and 4, the computing device 1 includes a housing 11, an electronic component module 12 disposed within the housing 11, and an operating interface 13 disposed in the housing 11 and exposed from a top face of the housing 11. In this embodiment, the electronic component module 12 at least includes a motherboard 121, a hard disk 122 connected electrically to the motherboard 121, and a central processing unit 123 disposed on the motherboard 121. Certainly, the electronic component module 12 may further include other components, such as video cards, memory cards, etc., for proper operation of the computing device 1. The operating interface 13 includes a keyboard 131 and a touch pad 132.

Figure 5:
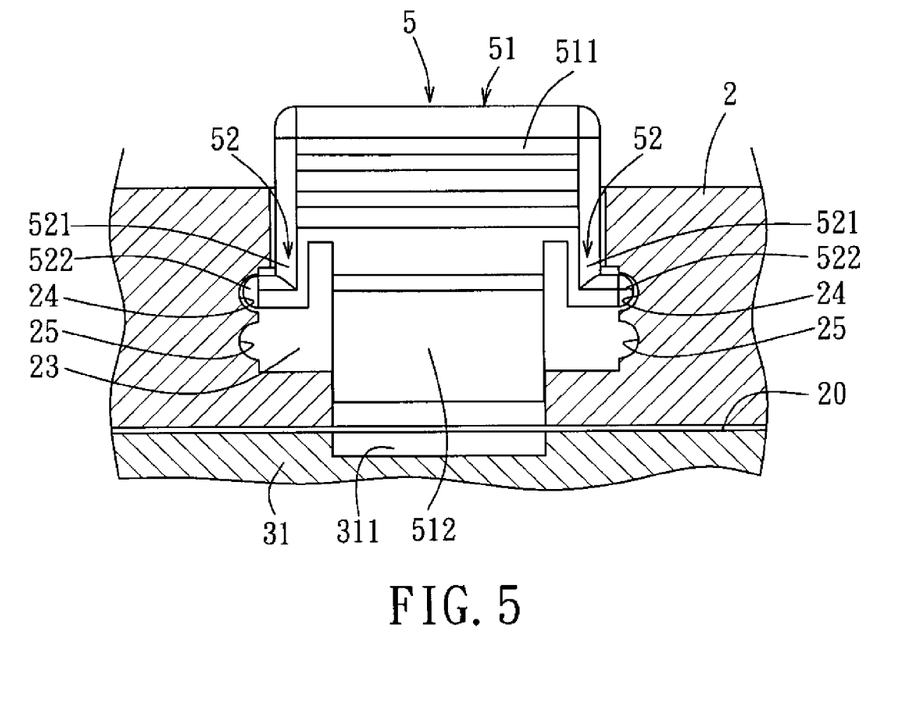
FIG. 5 is a fragmentary sectional view of the first preferred embodiment to illustrate a retaining member disposed in the display casing.

In this embodiment, the display casing 2 includes a back plate 21 and a frame 22 coupled to a front side of the back plate 21. The back plate 21 and a bottom edge of the frame 22 cooperatively define a bottom portion of the display casing 2 which is disposed pivotably on the housing 11 of the computing device 1. The frame 22 has an inner edge 222 that cooperates with the back plate 21 to define a recess 20 that is recessed rearwardly. Referring further to FIG. 5, in this embodiment, the frame 22 has a lower frame strip 220 which has an inner side that is recessed to format least one positioning indentation 221 in spatial communication with the recess 20, the function of which will be described hereinafter.

Figure 3:
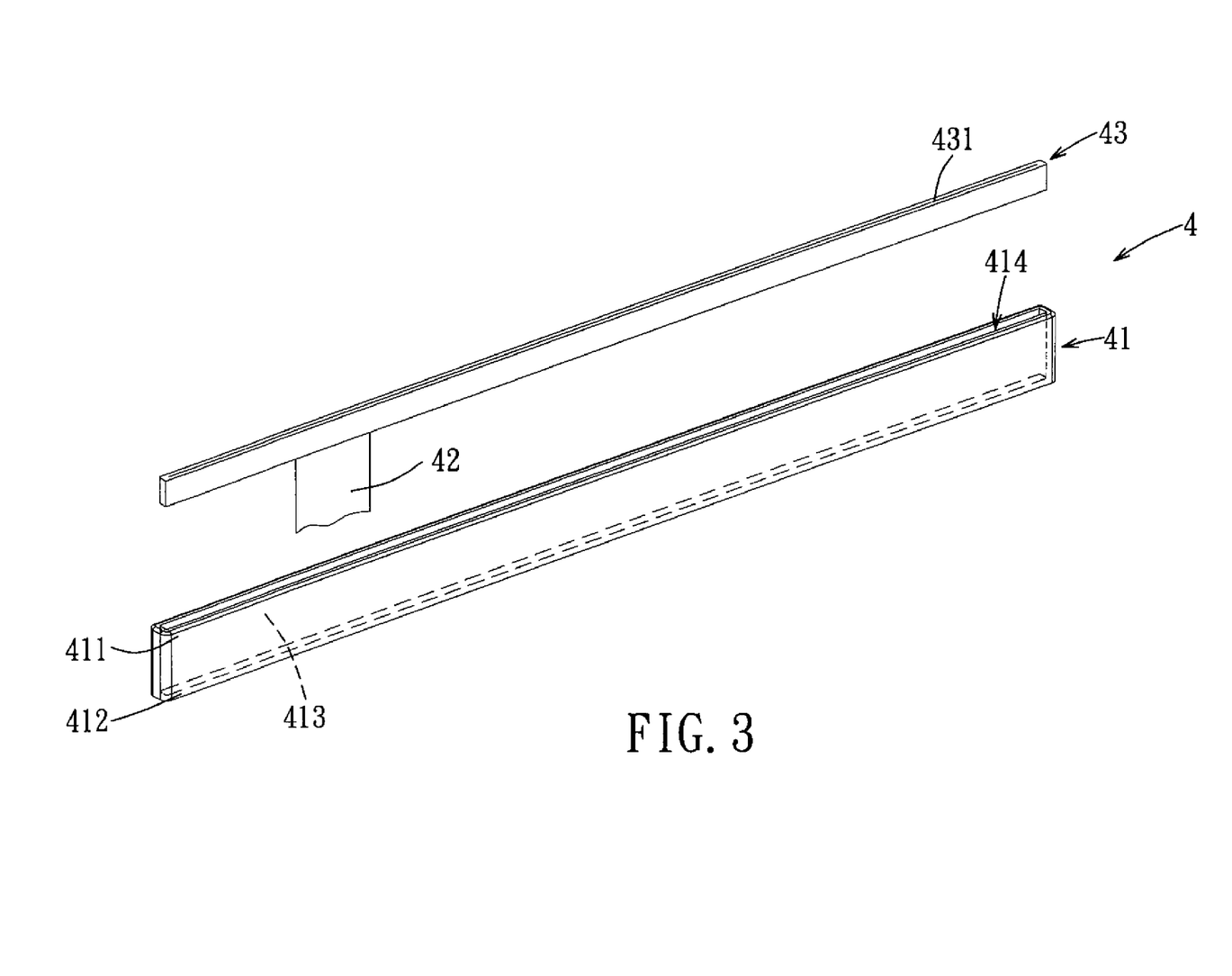
FIG. 3 is a fragmentary exploded perspective view of a connecting unit of the first preferred embodiment.

Referring to FIGS. 2, 3 and 4, the connecting unit 4 includes a case 41, a flexible signal connecting member 92, and a first electrical connecting member 93. The case 41 includes a first portion 411 and a second portion 412 that are interconnected with one on top of the other. The first portion 411 is formed with a receiving space 413 for receiving the first electrical connecting member 93, and has a top portion formed with a top opening 414 that is spatial communication with the receiving space 413. In this embodiment, the first portion 411 and the second portion 412 are formed integrally so as to have a substantially flat hollow configuration, and are made from a flexible material. Thus, as shown in FIGS. 2 and 4, the first portion 411 is displaceable forwardly and rearwardly relative to the second portion 412 so as to result in partial flexure and deformation of the case 41. The first electrical connecting member 43 is disposed in the first portion 411. In practice, the first electrical connecting member 43 may be a slot connector having an elongated slot 431 and a plurality of contact terminals (not shown) disposed in the slot 431. In this embodiment, the case 41 is interposed between the back plate 21 of the display casing 2 and the frame 22. The slot 431 of the first electrical connecting member 43 may be exposed to the recess 20 in the display casing 2 through the top opening 414. In this embodiment, in order to enable the first portion 411 to displace forwardly relative to the second portion 412, the first portion 411 is exposed to the recess 20 in the frame 22 when the case 41 is disposed in the display casing 2.

The flexible signal connecting member 42 is a flexible ribbon cable in this embodiment, and has one end extending through the second portion 412 of the case 41 into the first portion 411 to be connected electrically to the contact terminals of the first electrical connecting member 43, and another end extending into the housing 11 of the computing device 1 and connected electrically to the motherboard 121. Due to the arrangement of the flexible signal connecting member 42, the first electrical connecting member 43 which is disposed in the case 41 is capable of movement with the first portion 411 of the case 41.

The display panel 3 includes a panel unit 31 for displaying images, at least one positioning lug 33 formed on a bottom edge of the panel unit 31, and a second electrical connecting member 32 disposed on the bottom portion of the panel unit 31. In this embodiment, there are provided a plurality of positioning lugs 33, and the frame 22 is provided with a plurality of the positioning indentations 221 corresponding in number to the positioning lugs 33. The second electrical connecting member 32 includes a circuit board 321 and a plurality of contact terminals 322 disposed on the circuit board 321. The contact terminals 322 are formed from copper foil circuits.

Referring to FIGS. 2 and 4, it is initially noted that, since the first portion 411 of the case 41 is displaceable forwardly and rearwardly relative to the second portion 412, the first portion 411 of the case 41 can be adjusted to lean slightly forward relative to the second portion 412 prior to mounting the display panel 3 in the display casing 2 so as to facilitate insertion of the second electrical connecting member 32 of the display panel 3 into the first electrical connecting member 43 of the connecting unit 4.

Figure 6:
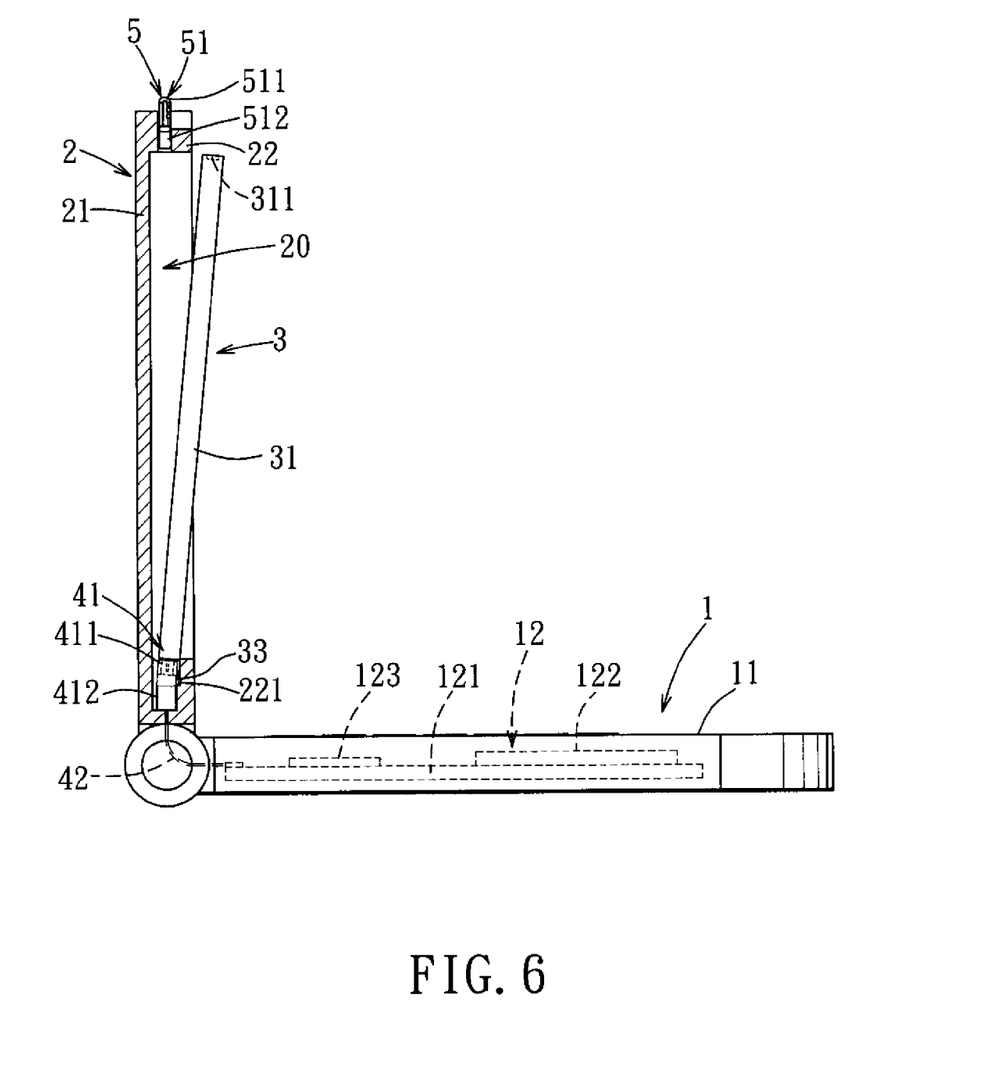
FIG. 6 is a partly sectional, schematic side view of the first preferred embodiment to illustrate how the display panel is mounted in the display casing.
Figure 7:
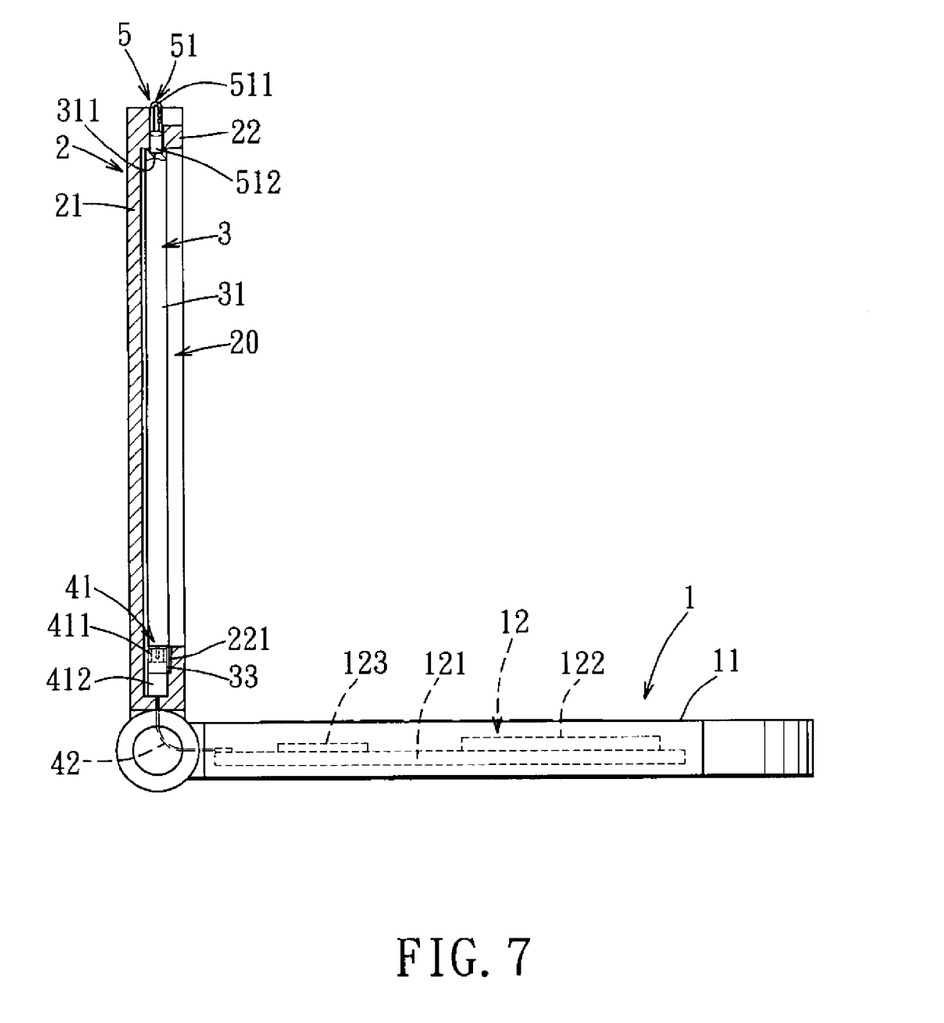
FIG. 7 is a partly sectional, schematic side view of the first preferred embodiment to illustrate the display panel received in a recess in the display casing.

Referring to FIGS. 4, 6, and 7, when it is desired to mount the display panel 3 in the display casing 2, the positioning lugs 33 on the bottom edge of the panel unit 31 are respectively inserted into the positioning indentations 221 in the display casing 2 so as to preliminarily align and position the display panel 3 relative to the display casing 2. Subsequently, the second electrical connecting member 32 of the display panel 3 is inserted into the slot 431 in the first electrical connecting member 43 disposed within the first portion 411 through the top opening 414 in the first portion 411. Thus, the panel unit 31 can be connected electrically to the motherboard 121 of the computing device 1 through the flexible signal connecting member 42. Thereafter, the panel unit 31 is displaced rearwardly relative to the display casing 2 by means of the first portion 411 which is capable of displacement relative to the second portion 412 so as to enable the panel unit 31 to be received in the recess 20, thereby completing mounting of the display panel 3 in the display casing 2.

Referring to FIG. 1 and FIGS. 5 to 7, in order that the panel unit 31 can be positioned in the recess of the display casing 2 relatively stably, the electronic device according to this embodiment further comprises a retaining member 5 disposed on the display casing 2 and capable of upward and downward displacement relative to the display casing 2. The display casing 2 is formed with a receiving groove 23 disposed above the recess 20 for receiving the retaining member 5, two first positioning grooves 24 disposed respectively on left and right sides of the receiving groove 23, and two second positioning grooves 25 disposed respectively below the two first positioning grooves 24. In addition, preferably, the panel unit 31 has a top edge that is recessed to form a retaining groove 311.

Referring to FIGS. 5 to 7, the retaining member 5 includes a body 51 and two resilient engaging portions 52. The body 51 is disposed in the receiving groove 23 and is substantially plate-shaped. The body 51 has an operating portion 511, and an end portion 512 extending downwardly from the operating portion 511. The two resilient engaging portions 52 extend downwardly from the operating portion 511 and are respectively disposed on two sides of the end portion 512. Each of the resilient engaging portions 52 has a resilient arm 521 spaced apart from the end portion 512, and a nose 522 extending transversely from a distal end of the resilient arm 521 and having a rounded distal end. The noses 522 of the two resilient engaging portions 52 can be disposed respectively in the two first positioning grooves 24 or the two second positioning grooves 25. Because of the resilient arms 521, the noses 522 are provided with a resiliency so as to be capable of transverse displacement. When the retaining member 5 is caused to displace upwardly or downwardly relative to the display casing 2, by means of the noses 522 of the two resilient engaging portions 52 that extend respectively into the two first positioning grooves 24 or the two second positioning grooves 25, the retaining member 5 can be positioned at an upper or a lower position. Moreover, when the retaining member 5 is disposed at a position where the noses 522 of the two resilient engaging portions 52 extend respectively into the two second positioning grooves 25, the end portion 512 of the body 51 extends into the recess 20 in the display casing 2.

Therefore, when the panel unit 31 is received in the recess 20 in the display casing 2, by causing the retaining member 5 to displace downwardly relative to the display casing 2 so that the noses 522 of the two resilient engaging portions 52 are respectively located in the two second positioning grooves 25, the end portion 512 of the body 51 of the retaining member 5 is allowed to extend into the retaining groove 311 in the top edge of the panel unit 31 to establish an interference fit with the panel unit 31, thereby confining the panel unit 31 to the recess 20 in the display casing 2.

When it is desired to remove the display panel 3 from the display casing 2, by causing the retaining member 5 to displace upwardly so that the two resilient engaging portions 52 displace upwardly to be disposed respectively in the first positioning grooves 24, the end portion 512 of the retaining member 5 can be brought to withdraw from the retaining groove 311 in the panel unit 31 and from the recess 20 in the display casing 2, thereby releasing the interference fit between the retaining member 5 and the panel unit 31. Subsequently, the panel unit 31 can be turned pivotally forward relative to the display casing 2 to be removed from the recess 20. Thereafter, by causing the panel unit 31 to displace upwardly to enable the second electrical connecting member 32 to disengage from the first electrical connecting member 43, the display panel 3 can be completely separated from the display casing 2.

It is noted that the receiving groove 23 provided in a top portion of the display casing 2 for receiving the retaining member 5 can be formed in the frame 22 or in both the back plate 21 and the frame 22 depending on actual design requirements.

In addition, in other embodiments of this invention, instead of providing a resilient engaging portion 52 on either side of the retaining member 5, the retaining member 5 may include only one resilient engaging portion 52. Accordingly, only one first positioning groove 24 and only one second positioning groove 25 are required.

As illustrated hereinabove, by inserting the circuit board 321 provided with the contact terminals 322 into the slot 431 to establish electrical connection between the display panel 3 and the computing device 1, a connection similar to that between an interface card and an insert slot can be achieved, so that the display panel 3 can be easily mounted and removed. In addition, problems associated with wiring between the display panel 3 and the computing device 1 and wire organization can be eliminated.

It is further noted that, while the electronic device according to the present invention is exemplified in this embodiment as a notebook computer constituted by the display module 200 and the computing device 1, the technical concept of coupling the display panel 3 and the display casing 2 through the inter-engagement between the first electrical connecting member 43 and the second electrical connecting member 32 and of using the retaining member 5 to help position the display panel 3 can be applied to a conventional desk-top display so that a panel unit of the desk-top display can be conveniently mounted and removed. In other words, the display module 200 may be a stand-alone device.

In addition, although the electronic device is exemplified to be a notebook computer in this embodiment, it may be a palm-top type electronic device or any electronic device with a video display functionality, such as a cellular phone, a personal digital assistant (PDA), a video game device, etc.

Figure 8:
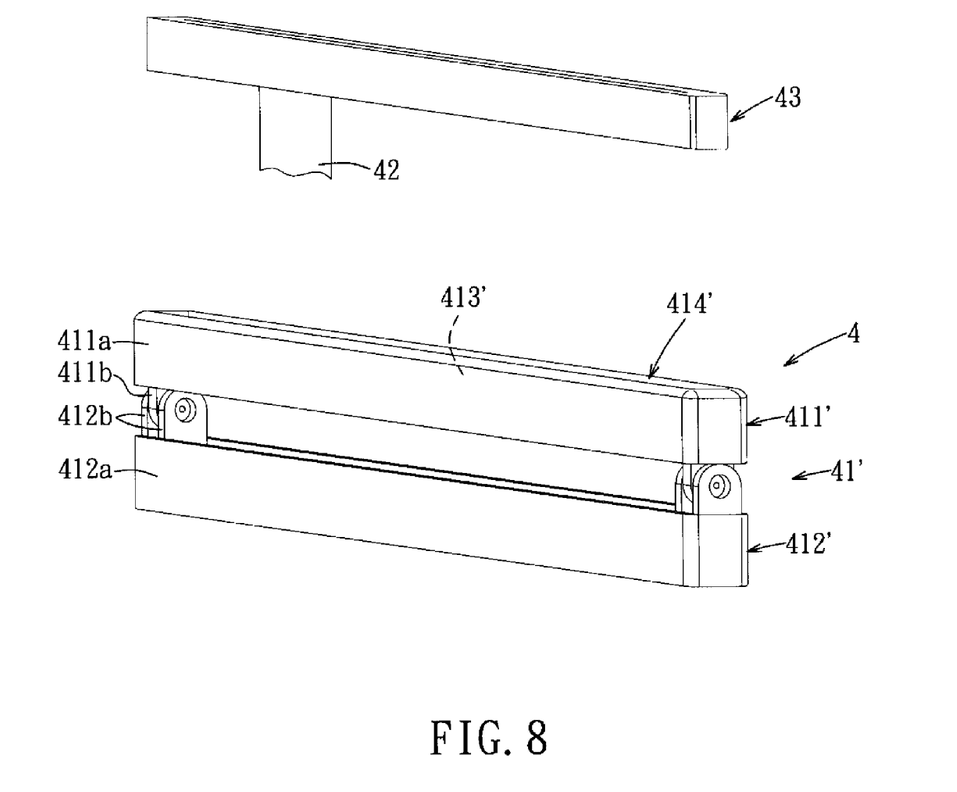
FIG. 8 is a fragmentary exploded perspective view of a connecting unit of the second preferred embodiment of an electronic device according to the present invention.
Figure 9:
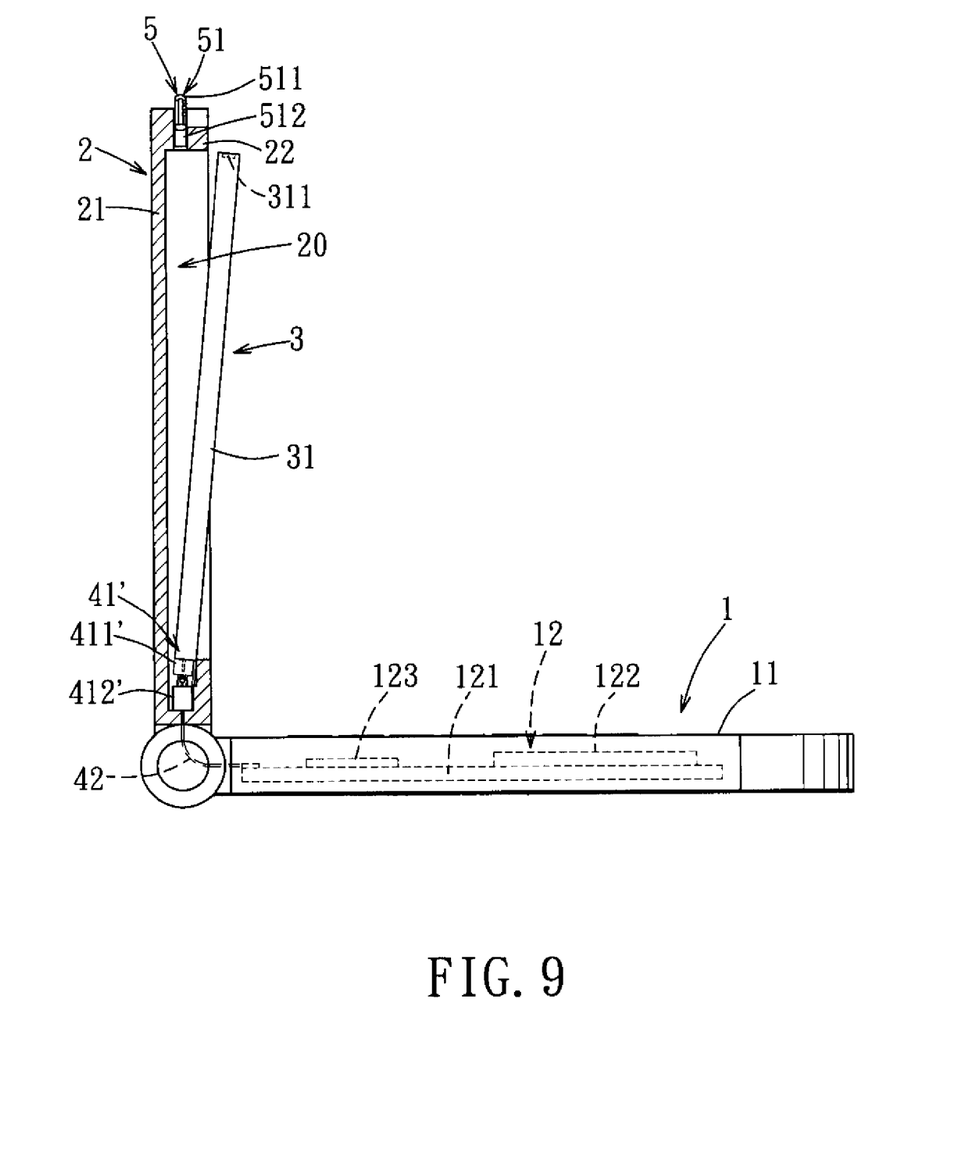
FIG. 9 is a partly sectional, schematic side view of the second preferred embodiment to illustrate how a display panel is mounted in a display casing.
Figure 10:
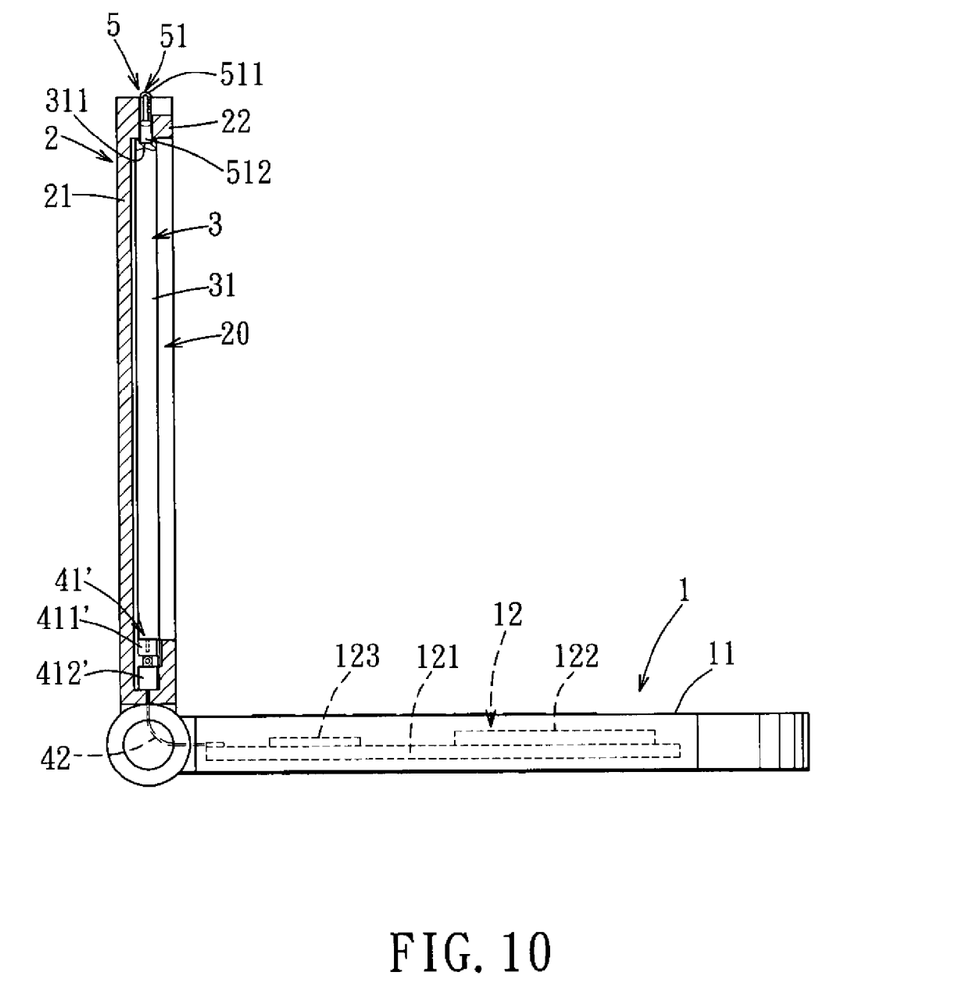
FIG. 10 is a partly sectional, schematic side view of the second preferred embodiment to illustrate the display panel received in a recess in the display casing.

Referring to FIGS. 8 to 10, the second preferred embodiment of an electronic device according to the present invention differs from the first preferred embodiment mainly in the case 41' of the connecting unit 4. In this embodiment, the case 41' includes interconnected first and second portions 411', 412' which are two separate components. The first portion 411' includes a substantially flat hollow first body (411a) and a plurality of first lugs (411b) extending downwardly from the first body (411a). The first body (411a) is formed with a receiving space 413' for receiving the first electrical connecting member 43, and a top opening 414' in spatial communication with the receiving space 413'. The second portion 412' includes a substantially flat hollow second body (412a) and a plurality of second lugs (412b) extending upwardly from the second body (412a). By means of the first lugs (411b) and the second lugs (412b) that are interconnected pivotably, the first and second portions 411', 412' can be interconnected such that the first portion 411' is movable pivotably relative to the second portion 412'.

The display panel 3 is connected insertably to the connecting unit 4 by means of the second electrical connecting member 32 that is inserted into the first electrical connecting member 43. Due to the capability of the first portion 411' of the case 41" to pivot relative to the second portion 412', the panel unit 31 can be pushed rearwardly into the recess 20 in the display casing 2. Thereafter, the retaining member 5 is caused to displace downwardly relative to the display casing 2 so that the end portion 512 of the retaining member 5 extends into the retaining groove 311 in the top edge of the panel unit 31 to achieve an interference fit with the panel unit 31, thereby confining the panel unit 31 to the recess 20 in the display casing 2.

In summary, by providing the display casing 2 and the panel unit 31 with the first electrical connecting member 43 and the second electrical connecting member 32, respectively, so that the panel unit 31 can be assembled to the display casing 2 and connected electrically to the computing device 1 through the insertable coupling between the first and second electrical connecting members 43, 32 (e.g., a circuit board provided with copper foil circuits and a slot connector for receiving the circuit board), or can be disassembled from the display casing 2 through separating the second electrical connecting member 32 from the first electrical connecting member 43, the present invention provides relatively easy mounting and removal of the display panel 3. Moreover, through the arrangement of the first and second electrical connecting members 32, 43 which are insertably coupled to establish electrical connection between the panel unit 31 and the computing device 1, wiring and wire organization procedures during the assembly process can be dispensed with.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
    a computing device including a housing, an electronic component module disposed within said housing, and an operating interface disposed in said housing and exposed from a top face of said housing; and
    a display module including
        a display casing connected to said housing of said computing device and formed with a recess;
        a connecting unit including a flexible signal connecting member connected electrically to said electronic component module of said computing device, and a first electrical connecting member connected electrically to said flexible signal connecting member and exposed to said recess in said display casing; and
        a display panel including a panel unit for displaying images, and a second electrical connecting member disposed on said panel unit and connected electrically to said panel unit, said second electrical connecting member being coupled insertably to said first electrical connecting member so as to enable said display panel to be connected electrically to said electronic component module of said computing device and to be received in said recess in said display casing;
    wherein said connecting unit further includes a case disposed in said display casing, said case including a first portion and a second portion that are interconnected with one above the other, said first portion being movable in said display casing relative to said second portion, said first portion being formed with a receiving space and a top opening in spatial communication with said receiving space, said first electrical connecting member being received in said receiving space in said first portion and being exposed through said top opening, said second electrical connecting member being extendable into said receiving space in said first portion through said top opening in said first portion so as to be coupled insertably to said first electrical connecting member.

2. The electronic device of claim 1, wherein said first portion and said second portion are separate components and are connected pivotably with one on top of the other, said first portion including a substantially flat hollow first body and a plurality of lugs extending downwardly from a bottom portion of said first body, said second portion including a substantially flat hollow second body and a plurality of lugs extending upwardly from a top portion of said second body, said first portion and said second portion being connected pivotably by means of said lugs.

3. The electronic device of claim 1, further comprising a retaining member disposed on a top portion of said display casing and capable of upward and downward displacement relative to said display casing, said retaining member having a body that has an operating portion and an end portion extending downwardly from said operating portion, said end portion being brought into an interference fit with said panel unit by virtue of downward displacement of said retaining member when said panel unit is received in said recess in said display casing, thereby confining said panel unit to said recess.

4. The electronic device of claim 3, wherein said retaining member further includes a resilient engaging portion connected to said body, said display casing being further formed with a receiving groove disposed above said recess for receiving said body, a first positioning groove in spatial communication with said receiving groove, and a second positioning groove disposed below said first positioning groove, said resilient engaging portion extending into a corresponding one of said first and second positioning grooves when said retaining member is displaced upwardly or downwardly relative to said display casing, said end portion of said retaining member being brought into the interference fit with said panel unit when said resilient engaging portion of said retaining member extends into said second positioning groove, said end portion of said retaining member being released from the interference fit with said panel unit when said resilient engaging portion of said retaining member extends into said first positioning groove.

5. The electronic device of claim 4, wherein said resilient engaging portion includes a resilient arm connected to said operating portion and spaced apart from said end portion, and a nose projecting from a distal end of said resilient arm and extendable into the corresponding one of said first and second positioning grooves.

6. The electronic device of claim 5, wherein said panel unit has a top edge formed with a retaining groove, said end portion of said retaining member extending into said retaining groove in said panel unit to achieve the interference fit with said panel unit when said resilient engaging portion of said retaining member extends into said second positioning groove, said end portion of said retaining member being released from said retaining groove in said panel unit and from the interference fit with said panel unit when said resilient engaging portion of said retaining member extends into said first positioning groove.

7. The electronic device of claim 1, wherein said display panel further includes at least one positioning lug projecting from a bottom edge of said panel unit, said frame having an inner side formed with at least one positioning indentation in spatial communication with said recess and corresponding in number to said positioning lug, said positioning indentation being arranged such that said positioning lug extends into said positioning indentation when said display panel is received in said recess.

8. The electronic device of claim 1, wherein one of said first and second electrical connecting members includes a circuit board and a plurality of conductive circuits disposed on said circuit board, the other of said first and second electrical connecting members including a slot for insertion of said circuit board thereinto and a plurality of contact terminals disposed in said slot and connectible electrically to said conductive circuits.

9. A display module for connection with a computing device, said display module comprising:
   a display casing formed with a recess;
   a connecting unit including
      a flexible signal connecting member for electrical connection with the computing device, and
      a first electrical connecting member connected electrically to said flexible signal connecting member and exposed to said recess in said display casing; and
   a display panel including
      a panel unit for displaying images, and
      a second electrical connecting member disposed on said panel unit and connected electrically to said panel unit, said second electrical connecting member being coupled insertably to said first electrical connecting member so as to enable said display panel to be connected electrically to the computing device and to be received in said recess in said display casing;
   wherein said connecting unit further includes a case disposed in said display casing, said case including a first portion and a second portion that are interconnected with one above the other, said first portion being movable in said display casing relative to said second portion, said first portion being formed with a receiving space and a top opening in spatial communication with said receiving space, said first electrical connecting member being received in said receiving space in said first portion and being exposed through said top opening, said second electrical connecting member being extendable into said receiving space in said first portion through said top opening in said first portion so as to be coupled insertably to said first electrical connecting member.

10. The display module of claim 9, wherein said first portion and said second portion are separate components and are connected pivotably with one on top of the other, said first portion including a substantially flat hollow first body and a plurality of lugs extending downwardly from a bottom portion of said first body, said second portion including a substantially flat hollow second body and a plurality of lugs extending upwardly from a top portion of said second body, said first portion and said second portion being connected pivotably by means of said lugs.

11. The display module of claim 9, further comprising a retaining member disposed on a top portion of said display casing and capable of upward and downward displacement relative to said display casing, said retaining member having a body that has an operating portion and an end portion extending downwardly from said operating portion, said end portion being brought into an interference fit with said panel unit by virtue of downward displacement of said retaining member when said panel unit is received in said recess in said display casing, thereby confining said panel unit to said recess.

12. The display module of claim 11, wherein said retaining member further includes a resilient engaging portion connected to said body, said display casing being further formed with a receiving groove disposed above said recess for receiving said body, a first positioning groove in spatial communication with said receiving groove, and a second positioning groove disposed below said first positioning groove, said resilient engaging portion extending into a corresponding one of said first and second positioning grooves when said retaining member is displaced upwardly or downwardly relative to said display casing, said end portion of said retaining member being brought into the interference fit with said panel unit when said resilient engaging portion of said retaining member extends into said second positioning groove, said end portion of said retaining member being released from the interference fit with said panel unit when said resilient engaging portion of said retaining member extends into said first positioning groove.

13. The display module of claim 12, wherein said resilient engaging portion includes a resilient arm connected to said operating portion and spaced apart from said end portion, and a nose projecting from a distal end of said resilient arm and extendable into the corresponding one of said first and second positioning grooves.

14. The display module of claim 13, wherein said panel unit has a top edge formed with a retaining groove, said end portion of said retaining member extending into said retaining groove in said panel unit to achieve the interference fit with said panel unit when said resilient engaging portion of said retaining member extends into said second positioning groove, said end portion of said retaining member being released from said retaining groove in said panel unit and from the interference fit with said panel unit when said resilient engaging portion of said retaining member extends into said first positioning groove.

15. The display module of claim 9, wherein said display panel further includes at least one positioning lug projecting from a bottom edge of said panel unit, said frame having an inner side formed with at least one positioning indentation in spatial communication with said recess and corresponding in number to said positioning lug, said positioning indentation being arranged such that said positioning lug extends into said positioning indentation when said display panel is received in said recess.

16. The display module of claim 9, wherein one of said first and second electrical connecting members includes a circuit board and a plurality of conductive circuits disposed on said circuit board, the other of said first and second electrical connecting members including a slot for insertion of said circuit board thereinto and a plurality of contact terminals disposed in said slot and connectible electrically to said conductive circuits.

17. An assembly for insertable coupling of a display panel thereto, said assembly comprising:
- a computing device, which includes a housing, an electronic component module disposed within said housing, and an operating interface disposed in said housing and exposed from a top face of said housing;
- a display casing, which is connected to said housing of said computing device and formed with a recess; and
- a connecting unit including a flexible signal connecting member connected electrically to said electronic component module of said computing device, and a first electrical connecting member connected electrically to said flexible signal connecting member and exposed to said recess in said display casing;
- said first electrical connecting member being disposed for insertion of the display panel thereinto so as to enable the display panel to be connected electrically to said electronic component module of said computing device and to be received in said recess in said display casing;
- wherein said connecting unit further includes a case disposed in said display casing, said case including a first portion and a second portion that are interconnected with one above the other, said first portion being movable in said display casing relative to said second portion, said first portion being formed with a receiving space and a top opening in spatial communication with said receiving space, said first electrical connecting member being received in said receiving space in said first portion and being exposed through said top opening.

18. The assembly of claim 17, wherein said first portion and said second portion are separate components and are connected pivotably with one on top of the other, said first portion including a substantially flat hollow first body and a plurality of lugs extending downwardly from a bottom portion of said first body, said second portion including a substantially flat hollow second body and a plurality of lugs extending upwardly from a top portion of said second body, said first portion and said second portion being connected pivotably by means of said lugs.

19. The assembly of claim 17, further comprising a retaining member disposed on a top portion of said display casing and capable of upward and downward displacement relative to said display casing, said retaining member having a body that has an operating portion and an end portion extending downwardly from said operating portion, said end portion being brought into an interference fit with the display panel by virtue of downward displacement of said retaining member when the display panel is received in said recess in said display casing, thereby confining the display panel to said recess.

20. The assembly of claim 19, wherein said retaining member further includes a resilient engaging portion connected to said body, said display casing being further formed with a receiving groove disposed above said recess for receiving said body, a first positioning groove in spatial communication with said receiving groove, and a second positioning groove disposed below said first positioning groove, said resilient engaging portion extending into a corresponding one of said first and second positioning grooves when said retaining member is displaced upwardly or downwardly relative to said display casing, said end portion of said retaining member being brought into the interference fit with the display panel when said resilient engaging portion of said retaining member extends into said second positioning groove, said end portion of said retaining member being released from the interference fit with the display panel when said resilient engaging portion of said retaining member extends into said first positioning groove.

21. The assembly of claim 20, wherein said resilient engaging portion includes a resilient arm connected to said operating portion and spaced apart from said end portion, and a nose projecting from a distal end of said resilient arm and extendable into the corresponding one of said first and second positioning grooves.

22. The assembly of claim 17, the display panel including a panel unit and at least one positioning lug projecting from a bottom edge of the panel unit, wherein said frame has an inner side formed with at least one positioning indentation in spatial communication with said recess and corresponding in number to the positioning lug, said positioning indentation being arranged such that the positioning lug extends into said positioning indentation when the display panel is received in said recess.

23. The assembly of claim 17, the display panel including a second electrical connecting member, wherein one of said first and second electrical connecting members includes a circuit board and a plurality of conductive circuits disposed on said circuit board, the other of said first and second electrical connecting members including a slot for insertion of said circuit board thereinto and a plurality of contact terminals disposed in said slot and connectible electrically to said conductive circuits.

24. An electronic device comprising:
- a computing device including a housing, an electronic component module disposed within said housing, and an operating interface disposed in said housing and exposed from a top face of said housing;
- a display module including
  - a display casing connected to said housing of said computing device and formed with a recess;
  - a connecting unit including a flexible signal connecting member connected electrically to said electronic component module of said computing device, and a first electrical connecting member connected electrically to said flexible signal connecting member and exposed to said recess in said display casing; and
  - a display panel including a panel unit for displaying images, and a second electrical connecting member disposed on said panel unit and connected electrically to said panel unit, said second electrical connecting member being coupled insertably to said first electrical connecting member so as to enable said display panel to be connected electrically to said electronic component module of said computing device and to be received in said recess in said display casing; and
- a retaining member disposed on a top portion of said display casing and capable of upward and downward displacement relative to said display casing, said retaining member having a body that has an operating portion and an end portion extending downwardly from said operating portion, said end portion being brought into an interference fit with said panel unit by virtue of downward displacement of said retaining member when said panel unit is received in said recess in said display casing, thereby confining said panel unit to said recess.

* * * * *